US007568393B2

(12) United States Patent
Adam et al.

(10) Patent No.: US 7,568,393 B2
(45) Date of Patent: Aug. 4, 2009

(54) AIR-PRESSURE SENSOR FOR SIDE-IMPACT DETECTION

(75) Inventors: Boris Adam, Gaeufelden (DE); Stephan Henzler, Gomaringen (DE); Martin Schuerer, Aichtal (DE); Tobby Brandt, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/999,798

(22) Filed: Dec. 7, 2007

(65) Prior Publication Data

US 2008/0141779 A1 Jun. 19, 2008

(30) Foreign Application Priority Data

Dec. 11, 2006 (DE) ....................... 10 2006 058 301

(51) Int. Cl.
*G01L 7/08* (2006.01)

(52) U.S. Cl. ............................ 73/715; 73/700; 73/714; 73/730

(58) Field of Classification Search ........... 73/700–756; 361/283.1–283.4
See application file for complete search history.

(56) References Cited

U.S. PATENT DOCUMENTS

| | | | | |
|---|---|---|---|---|
| 4,212,191 | A * | 7/1980 | Ethridge | 73/861.47 |
| 4,833,920 | A * | 5/1989 | Knecht et al. | 73/717 |
| 5,748,075 | A * | 5/1998 | Dirmeyer et al. | 340/436 |
| 6,557,423 | B1 * | 5/2003 | Vozhdaev et al. | 73/861.65 |
| 7,331,238 | B2 * | 2/2008 | Wanami et al. | 73/714 |
| 7,380,458 | B1 * | 6/2008 | Date et al. | 73/700 |
| 7,406,875 | B2 * | 8/2008 | Wanami et al. | 73/715 |
| 7,454,976 | B2 * | 11/2008 | Wanami et al. | 73/730 |

FOREIGN PATENT DOCUMENTS

| | | |
|---|---|---|
| DE | 199 23 985 | 12/2000 |

* cited by examiner

*Primary Examiner*—Andre J Allen
*Assistant Examiner*—Jermaine Jenkins
(74) *Attorney, Agent, or Firm*—Kenyon & Kenyon LLP

(57) ABSTRACT

An air-pressure sensor for side-impact sensing, and a pressure-entry channel, which conveys the air pressure to a pressure-sensor element. The pressure-entry channel has multiple angles.

4 Claims, 2 Drawing Sheets

PAS4
PPS1
UFS2
UFS2
PAS4
PPS1

Fig. 1
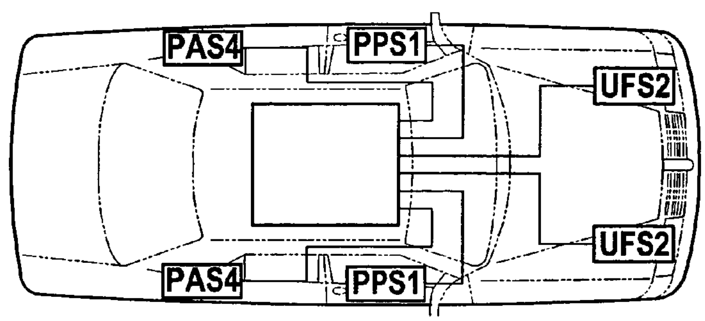
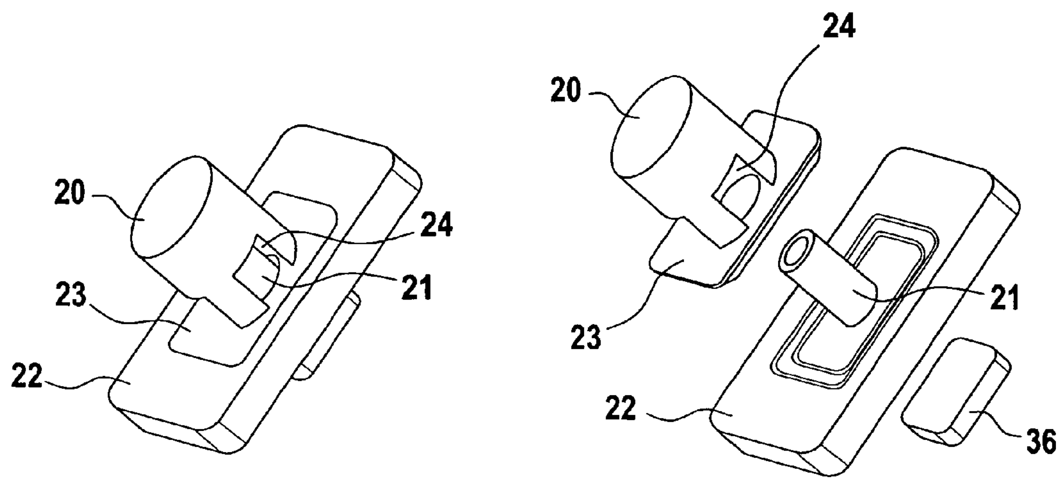
Fig. 2a
Fig. 2b

AIR-PRESSURE SENSOR FOR SIDE-IMPACT DETECTION

BACKGROUND INFORMATION

A pressure sensor for side-impact sensing in which a channel allows the air to flow directly onto a sensor element is described in German Patent Application No. DE 199 23 985. The sensor element can be protected by a diaphragm. The channel is realized with the aid of a plurality of housing components.

SUMMARY OF THE INVENTION

The air-pressure sensor for side-impact sensing according to the present invention has the advantage over the related art that the pressure-entry channel has multiple angles. This prevents the entry of all types of media or makes such entry more difficult. In particular, the dynamics in the transmission of the pressure increase in the event of a crash are not affected.

An air-pressure sensor is screwed onto a panel in the side door of a vehicle via two holding brackets. The opening of the pressure-entry channel is always oriented such that a pressure increase in the wet zone of the door is able to be detected. The task of the entry channel is to ensure the transmission of the pressure increase in the wet region of the door to the surface of a pressure-measuring element, preferably a pressure diaphragm. The pressure diaphragm is also to be protected from media influences as much as possible, which means the ingress of dust, water and oil. The normal conditions in the wet region of the side door of a vehicle must not affect the functioning of the pressure sensor over the service life. All currently provided pressure sensors with an application area in crash sensor systems have the problem of allowing only very limited protection of the sensor diaphragm against contact by media. Tests have shown that some of the conventional entry channel designs allow spray water or dust to be transmitted to the sensor element virtually unhindered. One possibility for protecting the diaphragm from media theoretically is the passivation with the aid of silicon gels. However, a silicon gel on the diaphragm leads to an increased acceleration sensitivity of the system.

Therefore, the design approach according to the present invention is provided, and the pressure-entry channel has a plurality of angles. In this way, there is no direct or indirect flight path for media particles that are able to travel up to the pressure-measuring diaphragm via a single reflection or no reflection. According to the present invention, the multiple angles require the spray water droplets or other media particles to be reflected at the wall of the housing lid at least three times in order to reach the interior of the sensor and thus the diaphragm. As a result, the occurrence of a transport process for media particles, reflected multiple times, is less likely by an order of magnitude than the mostly straight flight of a media particle. The dynamics of the pressure increase are ensured by sufficient clearance of the walls.

Furthermore, the design of the present invention makes it possible to prevent the intrusion of wire. This satisfies the so-called IPX3 protection category.

It is especially advantageous that the pressure-entry channel has three 90° angles. This is a very efficient angling for the purpose of preventing the ingress of media.

The pressure-entry channel is preferably formed by a hollow cylinder on the housing of the air-pressure sensor and a lid having at least two openings, the lid being mounted above the hollow cylinder. Thus, the hollow cylinder is part of the pressure-entry channel, which, for example, guides the pressure increase onto the sensor element. Due to the lid that surrounds this hollow cylinder and which itself has at least two openings, the pressure is able to penetrate the space defined by the lid and the hollow cylinder. To penetrate the hollow cylinder, the pressure must be reflected at the walls of the hollow cylinder and the lid multiple times. This provides an efficient protection against the ingress of media to the pressure-sensor diaphragm.

Furthermore, it is advantageous that at least one opening of the at least two openings is at least partially open in the upward direction in the mounted state in order to prevent icing up of at least this upper opening and to ensure the operability of the air-pressure sensor in this manner.

The lid has preferably four openings and is also provided with an affixation plate, which has a bore hole for the hollow cylinder, so that the hollow cylinder is able to penetrate the lid through this bore hole. The affixation plate is permanently joined to the housing. This may be implemented by, for example, a type of welding or bonding or screwing. Other affixation means are also possible here.

BRIEF DESCRIPTION OF THE DRAWINGS

FIG. 1 shows a block diagram of a safety device in a motor vehicle.

FIGS. 2*a* and 2*b* show a representation of the air-pressure sensor with regard to its lid in the installed and de-installed state.

DETAILED DESCRIPTION

Figure 3A:
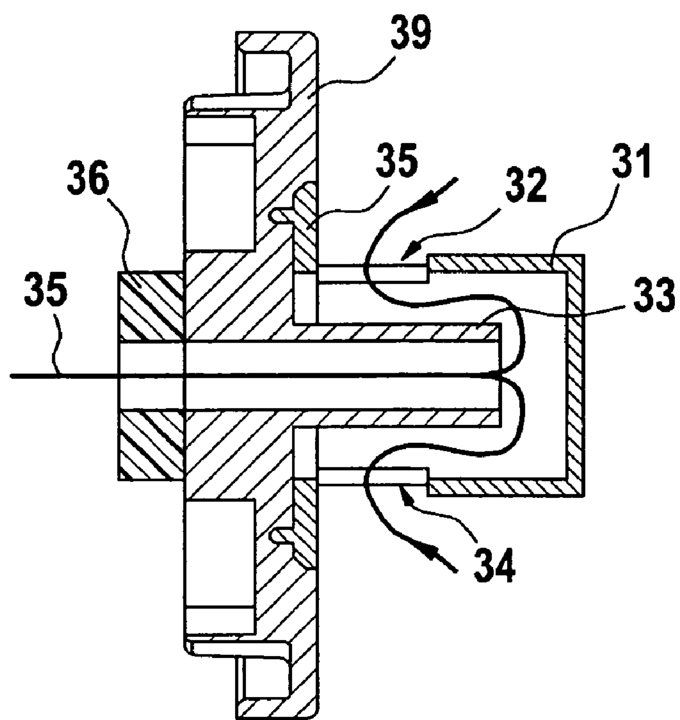
FIG. 3*a* shows a sectional view through the air-pressure sensor according to the present invention.

FIG. 1 schematically elucidates the configuration of a safety device in a vehicle that utilizes the air-pressure sensor according to the present invention. Vehicle FZ has a central air bag control device ECU. If air bag control device ECU itself has sensors such as acceleration or rate-of-rotation sensors, the usual installation location is the vehicle tunnel. If these sensors are not provided in control device ECU, then other installation locations in the vehicle may be selected as well.

Control device ECU receives signals from acceleration sensors UFS2 installed on the vehicle front, acceleration sensors PAS4 installed on the vehicle sides, and pressure sensors PPS1 installed in side components, preferably doors, of the vehicle, as a function of which control device ECU triggers personal protection means such as air bags or belt tighteners, which are not shown.

More or fewer than the sensors shown there may be installed. In particular, it is possible to use four air-pressure sensors per vehicle. Acceleration sensors PAS4 are used, for instance, to subject the decision made on the basis of the air-pressure signal to a plausibility check. The acceleration sensors may be placed in the B-column as usual.

FIG. 2*a* shows the air-pressure sensor in the installed state. A lid 20 is mounted above a hollow cylinder 21 of the housing of the air-pressure sensor, an affixation plate 23 being permanently joined to housing 22, for example by welding. Hollow cylinder 21 is visible through an opening 24.

FIG. 2*b* shows an exploded view of the air-pressure sensor according to the present invention. Lid 20 with bottom plate 23 and opening 24 is now separated from housing 22 having hollow cylinder 21. Element 36 is a silicon seal. This seal 36 separates the electronics space in the interior of the sensor from the region of the pressure-sensor chip, which is in contact with the outside via the air in the pressure channel. With that, protection from atmospheric humidity is realized.

FIG. 3*a* shows a sectional view of the air-pressure sensor according to the present invention. Lid 31 is permanently mounted on housing 39 via a base plate 38. Lid 31 and housing 39 thus form air-pressure sensor 30. Lid 31 has openings 32 and 34 through which a pressure increase is able to penetrate the interior of the air-pressure sensor. Lower opening 34, in particular, may ice up in the process. The change in air pressure exposes itself in the channel formed by the hollow cylinder and lid 31 into hollow cylinder 33 to a sensor element.

Figure 3B:
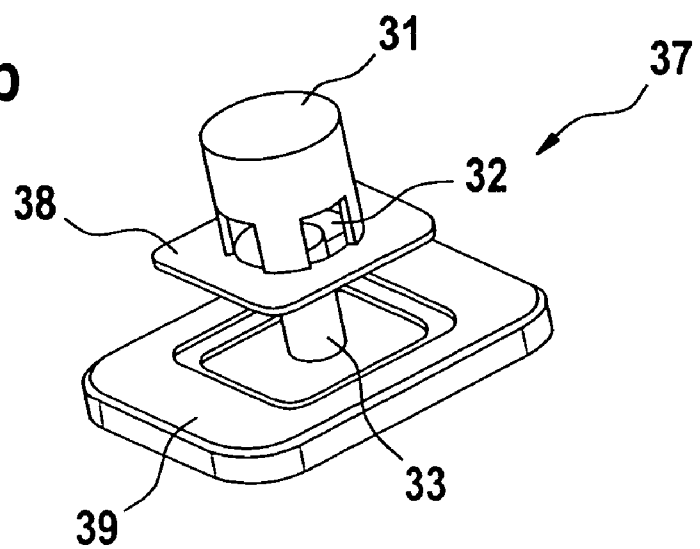
FIG. 3*b* shows an additional exploded view of the air-pressure sensor according to the present invention.

FIG. 3*b* shows an additional exploded view of the air-pressure sensor according to the present invention. A lid 31 is affixed on housing 39 above hollow cylinder 33, which is part of housing 39. To this end, base plate 38 is then permanently joined to the air-pressure sensor in the corresponding depression in housing 39. The hollow cylinder can be seen through opening 32. This completes the production of air-pressure sensor 37.

What is claimed is:

1. An air-pressure sensor for side-impact sensing, comprising:

a pressure-entry channel for conveying an air pressure to a pressure-sensor element, the pressure-entry channel having multiple angles;

wherein the pressure-entry channel is formed by a hollow cylinder on a housing of the air-pressure sensor and a lid having at least two openings, the lid being mounted above the hollow cylinder.

2. The air-pressure sensor according to claim 1, wherein the pressure-entry channel has three 90° angles.

3. The air-pressure sensor according to claim 1, wherein at least one opening of the at least two openings is at least partially open in an upward direction in an installed state.

4. The air-pressure sensor according to claim 1, wherein the lid has at least four openings and an affixation plate, which has a bore hole for the hollow cylinder, the affixation plate being permanently joined to the housing.

* * * * *